US012648584B2

(12) United States Patent
Sein et al.

(10) Patent No.: US 12,648,584 B2
(45) Date of Patent: Jun. 9, 2026

(54) RAPESEED PROTEIN COMPOSITION WITH HIGH PROTEIN QUALITY

(71) Applicant: DSM IP Assets B.V., Heerlen (NL)

(72) Inventors: Arjen Sein, Echt (NL); Maaike Johanna Bruins, Echt (NL); Ines Warnke, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 855 days.

(21) Appl. No.: 17/786,247

(22) PCT Filed: Dec. 17, 2020

(86) PCT No.: PCT/EP2020/086864
§ 371 (c)(1),
(2) Date: Jun. 16, 2022

(87) PCT Pub. No.: WO2021/123049
PCT Pub. Date: Jun. 24, 2021

(65) Prior Publication Data
US 2023/0054722 A1 Feb. 23, 2023

(30) Foreign Application Priority Data

Dec. 20, 2019 (EP) .................................... 19219166

(51) Int. Cl.
*A23L 33/185* (2016.01)
*A23C 11/10* (2025.01)
(52) U.S. Cl.
CPC .......... *A23L 33/185* (2016.08); *A23C 11/103* (2013.01)
(58) Field of Classification Search
CPC ............................. A23L 33/185; A23C 11/103
See application file for complete search history.

(56) References Cited

U.S. PATENT DOCUMENTS

2019/0307149 A1* 10/2019 Willemsen .............. A23L 11/30
2021/0084931 A1* 3/2021 Vlasie ..................... A23J 1/148

FOREIGN PATENT DOCUMENTS

WO 2018/007492 A1 1/2018
WO 2018/115340 A1 6/2018

OTHER PUBLICATIONS

International Search Report for PCT/EP2020/086864, mailed Feb. 12, 2021.
Canola PRO: The Perfect fit, Jan. 1, 2018, 2 pages, XP055692638.
DSM Canola pro (TM): Clean Label, Conference Mar. 28-29, 2017 Deb Anderson, Director of New Business Development—NA, Mar. 29, 2017, 11 pages, XP055693077.
Wanasundara et al., "Canola/rapeseed protein-functionality and nutrition," OCL, vol. 23, No. 4, Jul. 1, 2016, D407 (15 pages), XP055304289.
Boot et al., "The Safety and the generally recognized as safe (GRAS) Status of the proposed uses of canola/rapeseed protein isolate in human food" GRAS Notice (GRN) No. 683, Canola/Rapeseed Protein, GRAS Dossier DSM3732-001, May 10, 2017, 302 pages, XP055692558.
Mathai et al., "Values for digestible indispensable amino acid scores (DIAAS) for some dairy and plant proteins may better describe protein quality than values calculated using the concept for protein digestibility-corrected amino acid scores (PDCAAS)," British Journal of Nutrition, vol. 117, 2017, pp. 490-499 (10 pages).

* cited by examiner

*Primary Examiner* — Stephanie A Kohler
(74) *Attorney, Agent, or Firm* — McBee, Moore & Vanik IP, LLC

(57) ABSTRACT

The present invention is directed to a rapeseed protein isolate having a DIAAS value which is equal to or higher than 50. Further, the invention relates to a method for preparing such rapeseed protein isolate, to the use of such rapeseed protein isolate and to a food product comprising a rapeseed protein isolate having a high DIAAS value.

20 Claims, No Drawings

RAPESEED PROTEIN COMPOSITION WITH HIGH PROTEIN QUALITY

CROSS-REFERENCE TO RELATED APPLICATIONS

This application is the National Stage entry of International Application No. PCT/EP2020/086864, filed 17 Dec. 2020, which claims priority to European Patent Application No. EP19219166.6, filed 20 Dec. 2019.

BACKGROUND

Field of the Invention

The present invention is directed to a rapeseed protein isolate having a DIAAS value which is equal to or higher than 50. Further, the invention relates to a method for preparing such rapeseed protein isolate, to the use of such rapeseed protein isolate and to a food product comprising a rapeseed protein isolate having a high DIAAS value.

Description of Related Art

World population growth in combination with increasingly limited resources has resulted in the need for alternative protein sources to meet global protein requirements. The production of plant-based foods requires less land and water and is associated with lower greenhouse gas emissions compared with animal-based foods. However, plant-based proteins are believed to be of lesser quality than animal-based proteins.

Protein quality is the digestibility and quantity of essential amino acids for providing the proteins in correct ratios for human consumption. The Protein Digestibility Corrected Amino Acid Score (PDCAAS), which was recommended by the Food and Agriculture Organization of the United Nations (FAO), became the industry standard in 1993. Since 2013 FAO has recommended the newer Digestible Indispensable Amino Acid Score (DIAAS) to supersede PDCAAS. While PDCAAS truncates all protein types that exceed the essential amino acid requirements to 100%, DIAAS allows a higher than 100% ranking. For example, both soy protein isolate and whey protein isolate are ranked 100% according to PDCAAS, while in the DIAAS system whey has a higher score than soy. The main limitations of PDCAAS are that it does not take into account anti-nutrient factors like phytic acid and trypsin inhibitors, which limit the absorption of protein among other nutrients, and its use of fecal digestibility. In the DIAAS system, ileal digestibility of the essential amino acids is emphasized as a more accurate measure of protein absorption. DIAAS determines amino acid digestibility, at the end of the small intestine, providing a more accurate measure of the amounts of amino acids absorbed by the body and the protein's contribution to human amino acid and nitrogen requirements. PDCAAS is based on an estimate of crude protein digestibility determined over the total digestive tract, and values stated using this method generally overestimate the amount of amino acids absorbed as concluded by Mathai et al. (Br. J. Nutr. (2017) 117: 490-499) further establishing that DIAAS values for dairy proteins are greater than for proteins obtained from soy, pea or wheat.

For addressing the problem of insufficient nutritional quality of plant-derived proteins for human consumption, there is a need for plant-derived proteins that have DIAAS scores comparable to those of dairy proteins, such as for example those derived from whey. Application of the method of the invention unexpectedly results in rapeseed protein that has a superior DIAAS score compared to other plant-derived proteins and which approaches or even outscores that of dairy-derived proteins.

SUMMARY

In the context of the present invention the term "DIAAS" refers to Digestible Indispensable Amino Acid Score and is calculated as recommended by the Food and Agriculture Organization of the United Nations (Report of an Expert Consultation (2013) of the Food and Agriculture Organization of the United Nations (FAO); Dietary Protein Quality Evaluation in Human Nutrition) using equation DIAAS (%)=100×lowest value of the DIAA reference ratio. The DIAAS values may be calculated for different age groups and in the context of the present invention this is done according to the above FAO recommendation for 3 different age groups. These are infants (from birth to 6 mo.), children (from 6 mo. to 3 yr.), and older children, adolescents and adults (≥3 yr.).

The term "DIAA reference ratio" refers to Digestible Indispensable Amino Acid reference ratio and is calculated according to Cervantes-Pahm et al. (Br. J. Nutr. (2014) 111:1663-1672) using equation DIAA reference ratio=digestible indispensable amino acid content in 1 g protein of food (mg)/mg of the same dietary indispensable amino acid in 1 g of the reference protein.

As used herein, all the percentages are by weight (wt %) of the total weight of the product in question unless expressed otherwise. All ratios expressed herein are on a weight/weight (w/w) basis unless expressed otherwise.

In a first aspect there is provided a rapeseed protein isolate having a DIAAS value which is equal to or higher than 50. For example, the DIAAS value is from 50 to 200, or from 75 to 150, or from 90 to 125 or the DIAAS is 75±25. DIAAS values are related to human consumption, albeit that actual measurement can be achieved in other organisms following a suitable conversion as known to the skilled person. Hence, in an embodiment, there is provided a rapeseed protein isolate having a DIAAS value in humans which is equal to or higher than 50.

DETAILED DESCRIPTION OF A PREFERRED EMBODIMENT

In an embodiment, the rapeseed protein isolate is prepared from, or obtainable by, native rapeseed protein isolate, for example by following an incubating procedure as outlined in the second aspect of the invention. The favorable DIAAS values are obtained when, as a result of the procedure of the second aspect, the rapeseed protein isolate of the invention has an enthalpy of denaturation in the hydrated state ($\Delta H$ value) of around 0, for example of from 0 to 1 J/g or of 0±0.5 J/g. The $\Delta H$ value may be established for example by measuring a 40% (w/w) solution or dispersion of rapeseed protein isolate in water by means of Differential Scanning Calorimetry (DSC). The rapeseed protein isolate of the invention has a solubility in water that is lower than that of native rapeseed protein isolate which may be used to prepare the rapeseed protein isolate of the invention. For example, the rapeseed protein isolate of the invention has a solubility in water of from 1% to 60%, or of from 10% to 55%, or of from 20% to 50%. In an embodiment the solubility in water of the rapeseed protein isolate is 45±15%, or 45±10%, or 45±5%. Solubility in water may be determined by preparing a mixture of an accurately weighed amount of rapeseed protein isolate of of about 2% (w/w) in water at a set pH and temperature, for example pH 6.8±0.1 and 20±1° C., followed by stirring, centrifuging, and determining the protein concentration of the supernatant.

Native rapeseed protein isolate may be obtained for example from cold-pressed rapeseed oil meal as described in WO 2018/007492 and preferably contains less than 0.5% (w/w) phytate and has a high solubility, for example of at least 88% when measured over a pH range from 3 to 10 at a temperature of 23±2° C. The native rapeseed protein isolate has an enthalpy of denaturation in the hydrated state of from 1 to 10 J/g, or of from 2 to 6 J/g of a 40% (w/w) protein solution.

In an embodiment the rapeseed protein isolate of the present invention has a DIAAS value in older children, adolescents and adults aged 3 yr. and older which is equal to or higher than 100. In an embodiment the DIAAS value is from 100 to 200, or from 105 to 150, or from 110 to 135. For example, the DIAAS value may be 110±10. Preferably, the DIAAS value is from 101 to 130, or from 102 to 125, or from 103 to 120, or from 103 to 115.

In an embodiment the rapeseed protein isolate of the present invention has a DIAAS value in children aged 6 mo. to 3 yr. which is equal to or higher than 90. For example, the DIAAS value in children aged 6 mo. to 3 yr. is from 90 to 200, or from 95 to 150, or from 100 to 125, or from 101 to 120, or from 102 to 115, or from 103 to 110 or the DIAAS in children aged 6 mo. to 3 yr. is 100±10.

In another embodiment the rapeseed protein isolate of the present invention has a DIAAS value in infants aged 0 to 6 mo. which is equal to or higher than 50. For example, the DIAAS value in infants aged 0 to 6 mo. is from 50 to 150, or from 55 to 125, or from 60 to 100 or the DIAAS value in infants aged 0 to 6 mo. is 60±10.

It was found that heat-treated rapeseed protein isolate has superior DIAAS values compared to other plant-derived proteins. Notably, for the age group children (from 6 mo. to 3 yr.), heat-treated rapeseed protein isolate scored even better than whey, which is not plant-derived.

For example, in the instant invention it is established that in infants (from birth to 6 mo.), heat-treated rapeseed protein isolate has a DIAAS value of 60, compared to 43 for native rapeseed protein isolate. With the exception of soy, other plant-derived proteins (from brown rice and pea) scored significantly worse while the DIAAS value of heat-treated rapeseed protein isolate approaches that of whey protein isolate (67). In children (from 6 mo. to 3 yr.), heat-treated rapeseed protein isolate has a DIAAS value of 100, compared to 76 for native rapeseed protein isolate. All other plant-derived proteins (from brown rice, pea and soy) scored worse while the DIAAS value of heat-treated rapeseed protein isolate was even better than that of whey protein isolate (94). In older children, adolescents and adults (≥3 yr.), heat-treated rapeseed protein isolate has a DIAAS value of 110, compared to 83 for native rapeseed protein isolate. All other plant-derived proteins (from brown rice, pea and soy) scored worse while the DIAAS value of heat-treated rapeseed protein isolate approaches that of whey protein isolate (117).

In an embodiment, the rapeseed protein isolate comprises from 40 to 65% (w/w) cruciferins and from 35 to 60% (w/w) napins, the total being equal to or less than 100% (w/w) or comprises 80-100% (w/w) cruciferins and 0-20% (w/w) napins, or comprises 0-20% (w/w) cruciferins and 80-100% (w/w) napins, wherein the sum of cruciferins and napins is not exceeding 100% (w/w).

In a second aspect, the invention provides a method for preparing the rapeseed protein isolate of the first aspect wherein a mixture comprising native rapeseed protein isolate and water, or an aqueous protein solution comprising native rapeseed protein, is incubated at a temperature of from 70 to 100° C. for a period of from 2 to 100 minutes or by incubating at a temperature of from 120 to 150° C. for a period of from 2 seconds to 5 minutes. Preferably the present incubation steps results in a rapeseed protein isolate having an enthalpy of denaturation in the hydrated state (ΔH value) of around 0, for example of from 0 to 1 J/g or of 0±0.5 J/g. In an embodiment, the term incubating comprises heating.

Native rapeseed protein isolate used as starting material in the second aspect of the invention may be derived from rapeseed that usually is of the varieties *Brassica napus* or *Brassica juncea*. These varieties contain low levels of erucic acid and glucosinolates, and are the source of canola, a generic term for rapeseed oil comprising less than 2% erucic acid and less than 30 mmol/g glucosinolates. The predominant storage proteins found in rapeseed are cruciferins and napins. Cruciferins are globulins and are the major storage protein in the seed. A cruciferin is composed of 6 subunits and has a total molecular weight of approximately 300 kDa. Napins are albumins and are low molecular weight storage proteins with a molecular weight of approximately 14 kDa. Napins are more easily solubilized and are primarily proposed for use in applications where solubility is key. Rapeseed proteins can also be divided into various fractions according to the corresponding sedimentation coefficient in Svedberg units (S). This coefficient indicates the speed of sedimentation of a macromolecule in a centrifugal field. For rapeseed proteins, the main reported fractions are 12 S, 7 S and 2 S. Napin is a 2 S albumin, and cruciferin is a 12 S globulin. In the context of the present invention, the native rapeseed protein isolate comprises from 15 to 65% (w/w) cruciferins and from 35 to 85% (w/w) napins, the total being equal to or less than 100%. In one embodiment the native rapeseed protein isolate comprises from 40 to 65% (w/w) cruciferins and from 35 to 60% (w/w) napins, the total being equal to or less than 100% (w/w) or comprises 80-100% (w/w) cruciferins and 0-20% (w/w) napins, or comprises 0-20% (w/w) cruciferins and 80-100% (w/w) napins, wherein the sum of cruciferins and napins is not exceeding 100% (w/w).

In an embodiment, in order to achieve the rapeseed protein isolate having favorable DIAAS values, incubating is carried out on an aqueous protein solution in a concentration of from 1 to 60% (w/w), or from 5 to 40% (w/w) or from 8 to 25% (w/w), and heating is carried out at a temperature of from 75 to 98° C., or of from 80 to 96° C., or of from 85 to 95° C., or at 90±6° C. and for a period of time from 4 to 60 min, 6 to 30 min, 8 to 20 min, or 10±5 min. For example, heating may be carried out for 15±10 min at 91±5° C. Alternatively, heating may be carried out by sterilization/immediate high shear (HPH), indirect heating to at least 120° C. for at least 1 minute, or direct steam injection/flash cooling and subsequent high shear (HPH), or by processing in a scraped-surface heat exchanger of a concentrated solution (5-50%) holding at least 5 minutes at 90° C. and/or above, or by moist heat autoclaving. Heating may also be achieved by injecting a concentrated solution in a bath with (near) boiling water and collecting the precipitate, or by spray drying a solution at high temperature (>100° C.) for a time period sufficient to result in a rapeseed protein isolate having an enthalpy of denaturation in the hydrated state (ΔH value) of around 0, for example of from 0 to 1 J/g or of 0±0.5 J/g.

In an embodiment, the method of the invention comprises homogenizing of solids following the heating step. Thus, the method of the invention comprises the step of incubating the solution of native rapeseed protein isolate to a temperature of from 75 to 98° C. and subsequently homogenizing to form rapeseed protein isolate microparticles. The combination of a heat treatment followed by homogenizing produces rapeseed protein isolate particles having improved DIAAS values. Whilst heat treatment followed by homogenizing of plant-derived proteins was reported in WO 2018/115340, this was carried out on different proteins (from potato) with a different aim, namely to improve production of infant formulas by realizing higher solids content with defined particle size and reducing viscosity to improve efficiency of spray drying and improve the texture of the end-product. Before homogenizing, the mixture may be cooled to a temperature below 75° C., such as below 60° C. or below 45° C.

In an embodiment, size reduction of the aggregated protein particles is realized by homogenizing using any suitable means and apparatus known in the art, for example by means of high-pressure homogenization, e.g. by using high shear devices such as rotor/stator mixers, wet milling and the like. In an embodiment, the homogenizing may be carried out at a pressure of between 50 and 600 bar, for example between 200 and 400 bar and may be carried out in two stages at two different pressures.

In an embodiment, the method of the invention further comprises drying the mixture following homogenizing. Drying may be carried out using any suitable means and apparatus known in the art, for example by means of lyophilization or spray drying or drum drying. Spray drying may be carried out using a suitable spray drying apparatus to convert the liquid mixture to a powder. Preferably, the resulting powder has a moisture content of less than about 5% (w/w), for example of 3±2% (w/w) or from 0.001 to 10% (w/w), or from 0.01 to 5% (w/w), or from 0.1 to 3% (w/w). Advantageously, compositions with low water content are easy to handle, microbiologically more stable, and/or simpler or cheaper to transport. The dried composition may be further employed in other food products such as powder meal replacement products, that can be consumed after re-dispersion of the powdered mix into water. Alternatively, the dried composition is a ready-to-mix beverage. Drying may be done in the presence of an auxiliary agent, such as maltodextrin which brings an additional advantage of improved dispersibility. Alternatively, the heat-treated and aggregated protein is obtained by solid/liquid separation or filtration.

In an embodiment, the method of the invention is carried out by adding said native rapeseed protein isolate and water to a food product as further outlined in the third aspect of the invention.

In an embodiment, the method of the invention does not comprise spray drying the present mixture comprising native rapeseed protein isolate and water, preferably at an inlet temperature of 150-200° C. and an outlet temperature of 50-100° C.

In a third aspect, the invention provides a method for making a food product comprising the steps of:
  a) mixing a rapeseed protein isolate according to the first aspect of the invention with a food product, or,
  b) mixing a native rapeseed protein isolate with a food product and incubating the obtained mixture at a temperature of from 70 to 100° C. for a period of from 2 to 100 min or by incubating at a temperature of from 120 to 150° C. for a period of from 2 seconds to 5 minutes.

In an embodiment, the method of the invention is carried out by adding said native rapeseed protein isolate and water to a food product followed by applying said heating to the resulting mixture. This embodiment is particularly suitable for application of rapeseed protein isolate in food products for which heating is not detrimental or even advantageous and/or required, such as for, but not limited to, microbiological preservation or thermosetting of the food product. Examples are food products that undergo pasteurization, baking, extrusion cooking or other manipulations that require heating of the protein in the presence of water. Examples are protein-based beverages, fermented products, creams, dressings and sauces, and baked products such as bread, cake and fine bakery, pizza, tortilla and the like, and meat alternatives such as vegetarian chicken pieces, vegetarian minced meat, vegetarian hamburgers, vegetarian meat balls, sliced meat alternatives/deli and vegetarian sausages. In this embodiment, the rapeseed protein isolate according to the first aspect of the invention is formed in situ in the food product, i.e. by heating the food product after native rapeseed protein isolate has been added to the food product. Heating of the food product is carried out at a temperature of from 75 to 98° C., or of from 80 to 96° C., or of from 85 to 95° C., or at 90±6° C. and for a period of time from 4 to 180 min, 6 to 120 min, 8 to 60 min, or 10 to 30 min. For example, heating may be carried out for 30±15 min at 90±10° C.

In an embodiment, the food product is a ready-to-mix beverage composition or a meat replacement product or a protein bar or a plant-protein fortified beverage. Suitable examples are e.g. so-called functional beverages such as protein waters, low in calories, high in protein and without sugar or beverages such as almond milk. Currently these beverages are mainly whey-based rather than plant-based. High DIAAS values, as achieved by the rapeseed protein isolate of the instant invention, are key for functional beverages.

In a fourth aspect, the invention provides the use of a rapeseed protein isolate according to the first aspect of the invention in the preparation of a food product.

In an embodiment the rapeseed protein isolate according to the first aspect of the invention is formed in situ in the food product, i.e. by heating the food product after native rapeseed protein isolate has been added to the food product. Heating of the food product is carried out by incubating at a temperature of from 75 to 98° C., or of from 80 to 96° C., or of from 85 to 95° C., or at 90±6° C. and for a period of time from 4 to 180 min, 6 to 120 min, 8 to 60 min, or 10 to 30 min. For example, heating may be carried out for 30±15 min at 90±10° C.

In general, suitable food products are those that are designed for human protein intake, for example beverages. Also, the use according to the fourth aspect of the invention relates to ready-to-mix beverage compositions and plant-protein fortified beverages.

In a fifth aspect, the invention provides a food product comprising a rapeseed protein isolate according to the first aspect of the invention.

Advantageously, rapeseed protein is a natural and versatile protein source useful for many food products, including beverages.

Suitable food products containing rapeseed protein isolate of the invention are ready-to-mix products for e.g. meal replacement shakes, sports nutrition, medical nutrition, and bars, like protein bars or snack bars, or in bakery products like cookies or other fine bakery products, bread, pizza, tortilla and the like. Alternatively, the rapeseed protein isolate of the invention can be incorporated in meat products, such as hamburgers, meat balls, sausages, sliced meat/ deli, and so forth, and meat alternatives, such as vegetarian hamburgers, vegetarian meat balls, vegetarian sausages and the like. Also, the food product may be pet food.

When the food product is a beverage, it may be in the form of a concentrate, a powder, such as a ready-to-mix beverage, or a liquid beverage, such as a ready-to-drink beverage. The rapeseed protein isolate of the invention may be present in the beverage in an amount of about 0.5 to 10% (w/w), 1 to 8% (w/w), 1.5 to 5% (w/w), or 2 to 5% (w/w) by weight of the beverage. In a further embodiment, the beverage comprises oil or fat in an amount up to 6.0% (w/w), or about 2.0 to 5.0% (w/w) by weight of the beverage. In a further embodiment, the beverage comprises sugars in an amount of from about 0.5 to 10% (w/w) by weight of the beverage, or alternative sweeteners such as aspartame, sucralose, sugar alcohols, steviol glycosides and the like. Non-limiting examples of such beverages are protein waters or protein-enriched beverages such as protein-enriched almond milk. In an embodiment the beverage is packaged in a container which may be a can or a bottle or the like, made from paper, glass, aluminum, a plastic and the like. Ideally the package has a volume that can hold beverage volumes that are normally supplied to consumers, i.e. from 0.2 to 2.5 L, for example 0.25 L, 0.3 L, 0.33 L, 0.5 L, 0.7 L, 0.75 L, 1 L or 1.5 L.

In another embodiment, the food product is a beverage further comprising another plant material. Examples are so-called plant-based milks which can be made from a plant source by dispersing seeds, grains or nuts into an aqueous phase, optionally removing part of the fibers and cell debris by filtration or centrifugation. Such plant materials may be derived from a variety of legumes and pulses such as soybean, pea, chickpea, fava bean, lentil, mung bean, peanut, lupin; oil seeds/cabbages such as rapeseed or canola, camelina, sesame, sunflower; cereals and pseudo cereals, such as wheat, barley, oat, rice, sorghum, quinoa, buckwheat; nuts, such as almond, hazelnut, walnut, cashew; coconut; nightshades such as potato. Thus, the food product of the instant invention can be a rapeseed protein-enriched almond milk, a rapeseed protein-enriched oat milk, a rapeseed protein-enriched rice milk, a rapeseed protein-enriched coconut milk, or a rapeseed protein-enriched nut milk such as a cashew nut milk. Further ingredients such as sweeteners, flavors and minerals (such as tricalcium phosphate to obtain a calcium level comparable to dairy milk, in a range of from 0.05 to 0.5% (w/w)) may be added. Many plant-based milks are relatively low in protein content, and therefore the food product of the instant invention fulfills the need to enrich such beverages with additional protein, to arrive at a nutritional value that better compares to dairy milk.

In a further embodiment, the food product according to the invention can be a food product at a pH of 2-9, more preferably 3.5-5 and 6.5-8, such as a low pH refreshing beverage, a fermented product (e.g. yoghurt equivalent) or sour cream equivalent or a fresh cheese equivalent, or sauces and dressings.

It was found that instability associated with the production of beverages comprising rapeseed protein isolate can be overcome by addition of hydrocolloids, optionally in combination with sufficient shear (such as high-pressure homogenizing). Suitable hydrocolloids are galactomannans (guar gum, locust bean gum and tara gum), gellan (including low or high acyl gellan), xanthan, pectins, alginates, carrageenans, gum Arabic, cellulose derivatives such as carboxymethyl cellulose, hydroxypropylmethyl cellulose, methyl cellulose, native and modified starches and the like. Also, combinations of several hydrocolloids, like carboxymethyl cellulose and high acyl gellan, may be employed.

In an embodiment, the amount of rapeseed protein isolate according to the invention relative to the total food composition is from 0.5-30% (w/w), or from 1-15% (w/w) or from 1.5-5% (w/w).

In an embodiment, the food product may further comprise sweetening agents and/or flavoring agents and/or coloring agents. Advantageously, the amount of added sweetening agents may be relatively low, or even zero, resulting from the phenomenon that rapeseed protein isolate has a sweet taste.

EXAMPLES

Materials and Methods

Rapeseed protein isolate (RPI) was prepared from cold-pressed rapeseed oil seed meal as described in WO 2018/007492; the protein content was 90% (w/w). The resultant RPI comprised in the range of from 40 to 65% (w/w) cruciferins and 35 to 60% (w/w) napins, contained less than 0.26% (w/w) phytate and had a solubility of at least 88% when measured over a pH range from 3 to 10 at a temperature of 23±2° C.

pH measurements were carried out using a Radiometer model PHM220 pH meter equipped with a PHC3085-8 Calomel Combined pH electrode (D=5 MM).

Heat-treated RPI was prepared as outlined in Example 1. Whey protein isolate (WPI) was Volactive UltraWhey 90 from Volac, Royston, UK. Soy protein isolate (SPI) was Supro 515 from Dupont, through Fitness Labs Nutrition Corporation, Toronto Canada. Pea protein concentrate (PPC) was Nutralys S85F from Roquettes Freres, Lestrem, France. Brown rice protein concentrate (BPC) was Oryzatein Silk 80 from Axiom Foods, Los Angeles, USA.

Differential Scanning Calorimetry (DSC) was carried out by preparing 40% solutions/dispersions of protein isolate in water. Approximately 30 mg of the solution/dispersion was pipetted into an aluminum container of 40 µL after which thermograms were acquired with the following settings:

DSC: Mettler Toledo DSC 1

Temp. profile: Step 1: 10 minutes isothermally at 25° C.; Step 2: 5° C.-125° C.

Rate: Rate 1: not applicable; Rate 2: 5° C./min

Reference: Empty 40 µL aluminum container with sealed lid

Sample: 20-30 mg in 40 µL aluminum container with sealed lid

Atmosphere: $N_2$ at 50 mL/min

Values for ΔH were determined by integration of the endothermal peak with STAR$^e$ software (version 12.10b) from Mettler Toledo. Enthalpies (ΔH) were normalized to J/g of a 40% protein solution.

Protein solubility was determined as follows. A mixture of about 2% protein was made by accurately weighing 4.4 g of protein powder in demi-water, filled up to 200.0 gram of total weight. The protein dispersion was mildly stirred for 30 minutes. Then the pH was adjusted to 6.8 using 4 M HCl or NaOH. The mixture was transferred to a 500 mL Sorvall bottle, closed and stirred for 60 minutes with a magnetic stirring bar. The stirring bar was removed, the bottle was weighed, and centrifuged for 15 minutes at 10,000 RPM in a Sorvall Ultra Centrifuge at a temperature of 20±1° C. About 2 to 4 ml of clear supernatant was collected in a separate container and used for protein analysis using the Dumas method. The protein solubility was calculated as follows:

$$\text{Protein solubility (\%)} = [\text{weight}_{supernatant} \times \text{nitrogen}_{supernatant}] / [\text{weight}_{total} \times \text{nitrogen}_{total}] \times 100\%$$

Example 1

Preparation of Heat-Treated RPI

Native RPI (60 kg; obtained according to WO 2018/007492) was dissolved in osmosed water (540 kg) at 55° C. with high-speed turbine mixer preventing foam formation. The temperature was increased to 90° C. and maintained at 90° C. for 10 minutes during which process aggregation was observed. The temperature was lowered to 70° C. and the mixture was ground with a high-speed turbine mixer for 15 minutes and further sheared using an Ultra-Turrax (at 18,000 rpm/370 kg/h). The resulting suspension was dried in a spray drying tower, with inlet/outlet air temperature set at 195/90° C. respectively, and a dryer feed rate of approximately 100 kg/h. This resulted in 24 kg of heat-treated RPI powder.

The material had a Total Microbial Plate Count (by standard method NF EN ISO 4833-1, measured at 30° C.) of <100 CFU/g, and for yeasts (by standard method NF V 08-036, measured at 25° C.) of <10 CFU/g.

Protein content of the dry powder was measured using standard Dumas measurement and denaturation behavior was measured using DSC. These measurements were also carried out for the starting non-heated RPI and for WPI, SPI, PPC and BPC (Table 1).

The heat-treated product had a solubility of 47%, whereas the starting native RPI had a solubility of 89%. The heat-treated product had a water content of 8.1% (average of two measurements).

TABLE 1

| Protein content and denaturation behavior of protein isolates/concentrates | | | |
|---|---|---|---|
| | N (mg/kg) | N × 6.25 (g/kg) | ΔH 40% solution (J/g) |
| Rapeseed protein isolate (RPI) | 157000 | 981 | 5.7 |
| Whey protein isolate (WPI) | 141000 | 881 | 2.5 |
| Pea protein concentrate (PPC) | 127000 | 794 | 0 |
| Brown rice protein concentrate (BPC) | 129000 | 806 | 0 |
| Soy protein isolate (SPI) | 138000 | 863 | 0 |
| RPI, heat-treated | 157000 | 981 | 0 |

Example 2

Determination of Digestible Indispensable Amino Acid Score of Various Proteins The Digestible Indispensable Amino Acid Score (DIAAS) of six proteins when fed to growing pigs was determined. These proteins (Table 2) included WPI, SPI, PPC, BPC, RPI (WO 2018/007492), and RPI heat-treated prepared as outlined in Example 1.

Seven diets were prepared (Tables 3 and 4); the six proteins were included in one diet each as the only amino acid containing ingredient. A nitrogen-free diet that was used to measure basal endogenous losses of amino acid and protein was also formulated. Vitamins and minerals were included in all diets to meet or exceed current nutrient requirement estimates of swine (National Research Council (2012) Nutrient requirements of swine. 11th ed. National Academy Press, Washington DC). All diets also contained 0.4% titanium dioxide as an indigestible marker and all diets were provided in meal form. A sample of each protein and of all diets were collected at the time of diet mixing and used for chemical and compositional analysis.

TABLE 2

| Analyzed amino acid composition of proteins (as-fed basis) | | | | | | |
|---|---|---|---|---|---|---|
| Item (%) | RPI | RPI heat-treated | WPI | SPI | BPC | PPC |
| Dry matter | 95.34 | 97.92 | 95.59 | 96.35 | 97.24 | 93.55 |
| Crude protein | 98.83 | 99.72 | 88.04 | 87.63 | 80.99 | 55.33 |
| Indispensable amino acids | | | | | | |
| Arg | 6.30 | 6.33 | 1.72 | 6.50 | 6.11 | 6.73 |
| His | 3.08 | 3.12 | 1.63 | 2.25 | 1.76 | 1.97 |
| Ile | 3.79 | 3.80 | 6.83 | 4.34 | 3.60 | 4.04 |
| Leu | 6.81 | 6.89 | 9.36 | 6.78 | 6.53 | 6.50 |
| Lys | 5.91 | 5.99 | 8.81 | 5.46 | 2.19 | 6.03 |
| Met | 1.95 | 1.95 | 1.93 | 1.10 | 2.06 | 0.79 |
| Phe | 3.77 | 3.81 | 2.89 | 4.63 | 4.44 | 4.54 |
| Thr | 3.26 | 3.31 | 6.97 | 3.12 | 2.63 | 2.75 |
| Trp | 1.41 | 1.52 | 2.07 | 1.20 | 1.01 | 0.73 |
| Val | 4.94 | 4.99 | 5.90 | 4.49 | 5.08 | 4.32 |
| Total | 41.22 | 41.71 | 48.11 | 39.87 | 35.41 | 38.4 |
| Dispensable amino acids | | | | | | |
| Ala | 4.06 | 4.11 | 4.64 | 3.70 | 4.39 | 3.38 |
| Asp | 5.51 | 5.51 | 10.56 | 9.54 | 6.71 | 8.94 |
| Cys | 3.43 | 3.33 | 2.39 | 1.01 | 1.76 | 0.80 |
| Glu | 22.09 | 22.25 | 16.78 | 15.97 | 13.61 | 12.88 |
| Gly | 4.65 | 4.65 | 1.56 | 3.66 | 3.40 | 3.24 |

TABLE 2-continued

| | | Analyzed amino acid composition of proteins (as-fed basis) | | | | |
|---|---|---|---|---|---|---|
| Item (%) | RPI | RPI heat-treated | WPI | SPI | BPC | PPC |
| Pro | 7.18 | 6.97 | 6.04 | 4.51 | 3.64 | 3.53 |
| Ser | 2.91 | 2.92 | 3.78 | 3.54 | 3.05 | 3.30 |
| Tyr | 2.01 | 2.01 | 2.68 | 3.29 | 4.11 | 3.02 |
| Total | 51.84 | 51.75 | 48.43 | 45.22 | 40.67 | 39.09 |
| Total amino acids | 93.06 | 93.46 | 96.54 | 85.09 | 76.08 | 77.49 |

TABLE 3

| | | Ingredient composition of experimental diets (as-fed basis) | | | | | |
|---|---|---|---|---|---|---|---|
| Item (%) | RPI | RPI heat-treated | WPI | SPI | BPC | PPC | N-free |
| Protein | 13.50 | 13.50 | 14.75 | 15.00 | 16.00 | 16.00 | — |
| Corn starch | 55.75 | 55.75 | 54.85 | 54.45 | 53.30 | 53.30 | 69.25 |
| Soybean oil | 4.00 | 4.00 | 4.00 | 4.00 | 4.00 | 4.00 | 4.00 |
| Sucrose | 20.00 | 20.00 | 20.00 | 20.00 | 20.00 | 20.00 | 20.00 |
| Limestone | 0.45 | 0.45 | 0.40 | 0.75 | 0.45 | 0.45 | 0.40 |
| CaHPO$_4$ | 1.75 | 1.75 | 1.45 | 1.25 | 1.70 | 1.70 | 1.80 |
| MgO | 0.10 | 0.10 | 0.10 | 0.10 | 0.10 | 0.10 | 0.10 |
| K$_2$CO$_3$ | 0.40 | 0.40 | 0.40 | 0.40 | 0.40 | 0.40 | 0.40 |
| Solka floc | 3.00 | 3.00 | 3.00 | 3.00 | 3.00 | 3.00 | 3.00 |
| NaCl | 0.50 | 0.50 | 0.50 | 0.50 | 0.50 | 0.50 | 0.50 |
| TiO$_2$ | 0.40 | 0.40 | 0.40 | 0.40 | 0.40 | 0.40 | 0.40 |
| Vitamin mineral premix[1] | 0.15 | 0.15 | 0.15 | 0.15 | 0.15 | 0.15 | 0.15 |

[1]The premix provided the following quantities of vitamins and microminerals per kilogram of complete diet: Vitamin A as retinyl acetate, 11,136 IU; vitamin D3 as cholecalciferol, 2,208 IU; vitamin E as DL-alpha tocopheryl acetate, 66 IU; vitamin K as menadione dimethylpyrimidinol bisulfite, 1.42 mg; thiamin as thiamine mononitrate, 0.24 mg; riboflavin, 6.59 mg; pyridoxine as pyridoxine hydrochloride, 0.24 mg; vitamin B12, 0.03 mg; D-pantothenic acid as D-calcium pantothenate, 23.5 mg; niacin, 44.1 mg; folic acid, 1.59 mg; biotin, 0.44 mg; Cu, 20 mg as CuSO$_4$ and CuCl$_2$; Fe, 126 mg as FeSO$_4$; I, 1.26 mg as ethylenediamine dihydroiodide; Mn, 60.2 mg as MnSO$_4$; Se, 0.3 mg as Na$_2$SeO$_3$ and selenium yeast; and Zn, 125.1 mg as ZnSO$_4$.

TABLE 4

| | | Analyzed amino acid composition of experimental diets (as-fed basis) | | | | | |
|---|---|---|---|---|---|---|---|
| Item (%) | RPI | RPI heat-treated | WPI | SPI | BPC | PPC | N-free |
| Dry matter | 93.39 | 93.59 | 93.52 | 93.05 | 93.32 | 92.80 | 91.53 |
| Crude protein | 14.18 | 14.24 | 12.98 | 13.62 | 13.69 | 13.93 | 0.319 |
| Indispensable amino acids | | | | | | | |
| Arg | 0.85 | 0.82 | 0.25 | 0.96 | 0.98 | 1.04 | 0.01 |
| His | 0.43 | 0.43 | 0.24 | 0.34 | 0.32 | 0.32 | 0.00 |
| Ile | 0.55 | 0.53 | 1.05 | 0.68 | 0.64 | 0.67 | 0.01 |
| Leu | 0.99 | 0.96 | 1.45 | 1.08 | 1.16 | 1.10 | 0.03 |
| Lys | 0.86 | 0.88 | 1.37 | 0.87 | 0.42 | 1.02 | 0.02 |
| Met | 0.27 | 0.26 | 0.27 | 0.17 | 0.35 | 0.13 | 0.00 |
| Phe | 0.56 | 0.53 | 0.45 | 0.73 | 0.77 | 0.76 | 0.02 |
| Thr | 0.47 | 0.46 | 1.07 | 0.50 | 0.51 | 0.47 | 0.01 |
| Trp | 0.21 | 0.21 | 0.33 | 0.20 | 0.17 | 0.12 | 0.02 |
| Val | 0.70 | 0.68 | 0.89 | 0.69 | 0.88 | 0.70 | 0.01 |
| Total | 5.89 | 5.76 | 7.37 | 6.22 | 6.20 | 6.33 | 0.13 |
| Dispensable amino acids | | | | | | | |
| Ala | 0.59 | 0.58 | 0.72 | 0.59 | 0.79 | 0.58 | 0.01 |
| Asp | 0.79 | 0.72 | 1.62 | 1.53 | 1.22 | 1.54 | 0.02 |
| Cys | 0.47 | 0.48 | 0.35 | 0.17 | 0.32 | 0.14 | 0.00 |
| Glu | 3.19 | 3.19 | 2.60 | 2.59 | 2.41 | 2.24 | 0.02 |
| Gly | 0.67 | 0.65 | 0.25 | 0.59 | 0.65 | 0.56 | 0.01 |

TABLE 4-continued

| Analyzed amino acid composition of experimental diets (as-fed basis) | | | | | | | |
| Item (%) | RPI | RPI heat-treated | WPI | SPI | BPC | PPC | N-free |
| --- | --- | --- | --- | --- | --- | --- | --- |
| Pro | 1.08 | 1.05 | 0.97 | 0.74 | 0.70 | 0.62 | 0.04 |
| Ser | 0.46 | 0.45 | 0.62 | 0.60 | 0.71 | 0.59 | 0.01 |
| Tyr | 0.24 | 0.23 | 0.32 | 0.40 | 0.52 | 0.37 | 0.01 |
| Total | 7.49 | 7.35 | 7.45 | 7.21 | 7.32 | 6.64 | 0.12 |
| Total AA | 13.38 | 13.11 | 14.82 | 13.43 | 13.52 | 12.97 | 0.25 |

Seven growing pigs (initial body weight, BW: 36.51±1.61 kg) were equipped with a T-cannula in the distal ileum and randomly allotted to a 7×7 Latin square design with the 7 diets and seven 7-day periods. All diets were fed to one pig in each period and no pig received the same diet more than once during the test. There were, therefore, 7 replicate pigs per treatment. It was previously determined, based on power-calculations, that at least 6 replicate pigs were needed to obtain results that are representative for a feed ingredient. Pigs were housed in individual pens (1.2×1.5 m) in an environmentally controlled room. Pens had smooth sides and fully slatted tribar floors, and a feeder and nipple drinker were installed in each pen.

All pigs were fed their assigned diets in a daily amount of 3.3 times the estimated energy requirement for maintenance (i.e., 197 kcal metabolizable energy per $kg^{0.60}$; National Research Council (2012) Nutrient requirements of swine. 11th ed. National Academy Press, Washington DC). Two equal meals were provided every day at 0700 and 1600 h. Water was available at all times. Pig weights were recorded at the beginning of each period and after the conclusion of the experiment. The amount of feed supplied each day was recorded. The initial 5 days of each period was considered to be the adaptation period to the diet, and ileal digesta was collected for 9 hours (from 0800 to 1700 h) on days 6 and 7 using the following procedure:

Pigs had a T-cannula installed in the distal ileum according to Stein et al. (J. Anim. Sci. (1998) 76:1433-1436)
  Pigs were allowed at least 7 days to recuperate after the surgery
  Pigs were randomly allotted to a 7×7 Latin Square design with 7 periods and 7 diets
  Experimental diets were provided in the amount of 3.3 times the estimated requirement for metabolizable energy (i.e., 197 kcal metabolizable energy per kg metabolic body weight)
  Each experimental period consisted of 5 days of adaptation to the diet and 2 days ileal digesta collection
  On ileal digesta collection days, the cannulas were opened right after feeding the morning meal: a 250 mL plastic bag was attached to the cannula using a cable tie and the normal peristalsis in the small intestine resulted in digesta being pushed into the bag; the bag was removed as soon as full or once every 30 min; ileal digesta were collected for 9 h on each of the 2 collection days in each period
  Collected ileal digesta were emptied into a pitcher and stored at −20° C.
  Collected ileal digesta from both collection days were emptied into the same pitcher
  At the conclusion of each period, the contents of each pitcher were thawed, mixed, and subsamples were collected Subsamples were freeze dried using an Uma Life Freeze drier and subsequently ground using a coffee grinder; ground samples were then analyzed On the completion of one experimental period, animals were deprived of feed overnight, and the following morning the new experimental diet was offered.

At the end of the experiment, ileal digesta samples were thawed, mixed within animal and diet, and a sub-sample was collected for chemical analysis. Ileal digesta samples were lyophilized and finely ground prior to chemical analysis. Samples of all ingredients, diets, and ileal digesta were analyzed for dry matter (Method 927.05; AOAC International (2007) Official Methods of Analysis. 18th ed. Rev. 2. W. Howitz, and G. W. Latimer, Jr., ed. Association of Official Analytical Chemists International, Gaithersburg, MD) and for crude protein by combustion (Method 990.03; AOAC International (2007) Official Methods of Analysis. 18th ed. Rev. 2. W. Howitz, and G. W. Latimer, Jr., ed. Association of Official Analytical Chemists International, Gaithersburg, MD) using a LECO FP628 analyzer (LECO Corp., Saint Joseph, MI). Diets and ileal digesta samples were also analyzed for amino acids (Method 982.30 E (a, b, c); AOAC International (2007) Official Methods of Analysis. 18th ed. Rev. 2. W. Howitz, and G. W. Latimer, Jr., ed. Association of Official Analytical Chemists International, Gaithersburg, MD) and for titanium (Method 990.08; Myers et al., J. Anim. Sci. (2004) 82:179-183).

Apparent Ileal Digestibility (AID) values for crude protein and amino acids in each diet were calculated using equation [1] (Stein et al., J. Anim. Sci. (2007) 85:172-180):

$$AID\ (\%)=[1-[(AA_d/AA_f) \times (Ti_f/Ti_d)] \times 100 \qquad [1]$$

where $AA_d$ is the concentration of that amino acid in the ileal digesta dry matter, $AA_f$ is the amino acid concentration of that amino acid in the feed dry matter, $Ti_f$ is the titanium concentration in the feed dry matter, and $Ti_d$ is the titanium concentration in the ileal digesta dry matter. The AID for crude protein was also calculated using this equation.

The basal endogenous flow to the distal ileum of each amino acid was determined based on the flow obtained after feeding the nitrogen-free diet using equation [2] (Stein et al., J. Anim. Sci. (2007) 85:172-180):

$$IAA_{end}=[AA_d \times (Ti_f/Ti_d)] \qquad [2]$$

where $IAA_{end}$ is the basal endogenous loss of an amino acid (mg per kg dry matter intake). The basal endogenous loss of crude protein was determined using the same equation.

By correcting the AID for the $IAA_{end}$ of each amino acid, standardized ileal amino acid digestibility values were calculated using equation [3] (Stein et al., J. Anim. Sci. (2007) 85:172-180):

$$SID\ (\%)=[(AID+IAA_{end})/AA_f] \qquad [3]$$

where SID is the standardized ileal digestibility value (%). The SID of crude protein was also calculated using this equation.

The DIAA reference ratio was calculated using the following equation [4] (Cervantes-Pahm et al., Br. J. Nutr. (2014) 111:1663-1672):

DIAA reference ratio=digestible indispensable amino acid content in 1 g protein of food (mg)/mg of the same dietary indispensable amino acid in 1 g of the reference protein    [4]

The DIAAS value was calculated for 3 different age groups as recommended by Food and Agriculture Organization of the United Nations (FAO) using the following equation [5] (FAO, 2013):

DIAAS (%)=100×lowest value of the DIAA reference ratio    [5]

At the conclusion of the experiment, data were analyzed by ANOVA using the MIXED procedure in SAS (SAS Institute Inc. Cary, NC). The pig was the experimental unit for all analyses. Diet was the fixed effect and pig and period were random effects. Treatment means were calculated using the LS MEANS statement in SAS, and if significant, means were separated using the PDIFF option in the MIXED procedure. An alpha value of 0.05 was used to assess significance among means.

Apparent Ileal Digestibility (AID)

From Table 5 it can be seen that WPI had the greater (P<0.05) AID of most indispensable amino acids, except Arg, Met, and Phe, compared with SPI and RPI heat-treated. The AID of all indispensable amino acids, except Leu and Met, did not differ between RPI heat-treated and SPI. RPI heat-treated had the greater (P<0.05) AID of His, Leu, Met, Thr, Trp, and Val compared with PPC and a greater (P<0.05) AID of all indispensable amino acids compared with RPI and BPC. SPI had a greater (P<0.05) AID of His, Met, Trp, and Val compared with PPC, and PPC had a greater (P<0.05) AID of all indispensable amino acids compared with BPC, except Trp, and RPI.

TABLE 5

AID of crude protein and amino acids (AA) in experimental ingredients[1]

| Item (%) | RPI | RPI heat-treated | WPI | SPI | BPC | PPC | Pooled SEM | P-value |
|---|---|---|---|---|---|---|---|---|
| Crude protein | 65.2$^c$ | 82.8$^{ab}$ | 86.9$^a$ | 82.9$^{ab}$ | 60.9$^c$ | 80.9$^b$ | 1.90 | <0.001 |
| Indispensable amino acids | | | | | | | | |
| Arg | 66.0$^c$ | 88.0$^a$ | 81.3$^b$ | 92.9$^a$ | 78.4$^b$ | 89.7$^a$ | 1.93 | <0.001 |
| His | 76.1$^c$ | 93.0$^a$ | 92.9$^a$ | 91.4$^a$ | 74.1$^c$ | 87.6$^b$ | 1.00 | <0.001 |
| Ile | 65.1$^d$ | 89.3$^b$ | 95.6$^a$ | 89.2$^b$ | 73.5$^c$ | 86.9$^b$ | 1.14 | <0.001 |
| Leu | 67.5$^e$ | 91.7$^b$ | 96.4$^a$ | 88.2$^c$ | 73.5$^d$ | 87.6$^c$ | 1.09 | <0.001 |
| Lys | 76.7$^c$ | 90.1$^b$ | 96.1$^a$ | 91.8$^b$ | 63.7$^d$ | 91.2$^b$ | 1.50 | <0.001 |
| Met | 76.3$^d$ | 94.7$^a$ | 95.3$^a$ | 90.2$^b$ | 69.0$^e$ | 82.6$^c$ | 0.96 | <0.001 |
| Phe | 65.5$^d$ | 90.5$^{ab}$ | 92.5$^a$ | 90.2$^{ab}$ | 75.4$^c$ | 89.0$^b$ | 1.06 | <0.001 |
| Thr | 59.9$^e$ | 81.8$^b$ | 87.0$^a$ | 79.2$^{bc}$ | 66.7$^d$ | 76.4$^c$ | 1.71 | <0.001 |
| Trp | 71.3$^d$ | 93.4$^b$ | 97.5$^a$ | 92.5$^b$ | 84.3$^c$ | 82.4$^c$ | 1.11 | <0.001 |
| Val | 63.8$^e$ | 87.2$^b$ | 90.9$^a$ | 84.9$^b$ | 72.3$^d$ | 81.4$^c$ | 1.23 | <0.001 |
| Mean | 68.4$^d$ | 89.6$^b$ | 93.3$^a$ | 89.1$^b$ | 73.2$^c$ | 86.9$^b$ | 1.06 | <0.001 |
| Dispensable amino acids | | | | | | | | |
| Ala | 64.1$^d$ | 84.3$^{ab}$ | 88.6$^a$ | 81.8$^{bc}$ | 67.6$^d$ | 79.7$^c$ | 1.58 | <0.001 |
| Asp | 48.8$^e$ | 79.9$^c$ | 94.9$^a$ | 89.1$^b$ | 67.2$^d$ | 88.8$^b$ | 1.54 | <0.001 |
| Cys | 80.7$^b$ | 90.4$^a$ | 94.1$^a$ | 80.5$^b$ | 62.7$^c$ | 59.5$^c$ | 1.84 | <0.001 |
| Glu | 80.0$^b$ | 92.8$^a$ | 93.9$^a$ | 93.4$^a$ | 70.6$^a$ | 92.0$^a$ | 0.95 | <0.001 |
| Gly | 57.3$^c$ | 74.8$^a$ | 59.4$^{bc}$ | 69.8$^{ab}$ | 48.9$^c$ | 59.4$^{bc}$ | 4.46 | 0.001 |
| Pro | 20.6$^{ab}$ | 36.9$^a$ | 54.6$^a$ | 16.9$^{ab}$ | −64.0$^c$ | −20.7$^{bc}$ | 22.06 | <0.001 |
| Ser | 65.0$^d$ | 85.0$^{ab}$ | 86.9$^a$ | 86.8$^a$ | 75.3$^c$ | 82.4$^b$ | 1.30 | <0.001 |
| Tyr | 55.2$^d$ | 84.9$^b$ | 92.4$^a$ | 89.4$^a$ | 68.7$^c$ | 84.3$^b$ | 1.32 | <0.001 |
| Mean | 63.0$^c$ | 80.1$^{ab}$ | 86.8$^a$ | 80.7$^{ab}$ | 54.9$^d$ | 74.9$^b$ | 3.07 | <0.001 |
| Total AA | 65.4$^c$ | 84.2$^b$ | 90.0$^a$ | 84.6$^b$ | 63.3$^c$ | 80.8$^b$ | 1.97 | <0.001 |

$^{a-e}$Means within a row lacking a common superscript letter differ (P < 0.05).

[1]Data are least squares means of 7 observations per treatment except for RPI, RPI heat-treated, and WPI that have 6 observations per treatment.

Standardized Ileal Digestibility (SID)

As shown in Table 6, WPI had a greater (P<0.05) SID of most indispensable amino acids compared with the other proteins, and the SID of Thr and Trp did not differ among WPI, SPI, and RPI heat-treated. RPI heat-treated had a greater (P<0.05) SID of all indispensable amino acids compared with RPI and BPC, and a greater (P<0.05) SID of all indispensable amino acids, except Arg and Lys, compared with PPC, but the SID of most indispensable amino acids did not differ between RPI heat-treated and SPI. PPC had a greater (P<0.05) SID of all indispensable amino acids compared with BPC, except Trp, and RPI.

TABLE 6

| | | | | SID of crude protein and amino acids (AA) in experimental ingredients[1,2] | | | | |
|---|---|---|---|---|---|---|---|---|
| Item (%) | RPI | RPI heat-treated | WPI | SPI | BPC | PPC | Pooled SEM | P-value |
| Crude protein | 78.9$^c$ | 96.5$^b$ | 101.9$^a$ | 97.2$^{ab}$ | 75.1$^c$ | 94.8$^b$ | 1.90 | <0.001 |
| | | | | Indispensable amino acids | | | | |
| Arg | 75.0$^d$ | 97.3$^b$ | 111.9$^a$ | 100.9$^b$ | 86.2$^c$ | 97.1$^b$ | 1.93 | <0.001 |
| His | 80.6$^d$ | 97.5$^b$ | 101.0$^a$ | 97.1$^b$ | 80.2$^d$ | 93.7$^c$ | 1.00 | <0.001 |
| Ile | 70.8$^e$ | 95.3$^b$ | 98.6$^a$ | 93.9$^{bc}$ | 78.5$^d$ | 91.7$^c$ | 1.14 | <0.001 |
| Leu | 73.0$^e$ | 97.3$^b$ | 100.1$^a$ | 93.2$^c$ | 78.1$^d$ | 92.5$^c$ | 1.09 | <0.001 |
| Lys | 81.6$^c$ | 94.9$^b$ | 99.2$^a$ | 96.8$^{ab}$ | 73.8$^d$ | 954$^{ab}$ | 1.50 | <0.001 |
| Met | 79.1$^d$ | 97.6$^a$ | 98.0$^a$ | 94.6$^b$ | 71.1$^e$ | 88.3$^c$ | 0.96 | <0.001 |
| Phe | 71.5$^e$ | 96.8$^b$ | 99.9$^a$ | 94.8$^{bc}$ | 79.7$^d$ | 93.4$^c$ | 1.06 | <0.001 |
| Thr | 71.9$^d$ | 94.2$^a$ | 92.3$^{ab}$ | 90.5$^{ab}$ | 77.8$^c$ | 88.5$^b$ | 1.71 | <0.001 |
| Trp | 76.3$^c$ | 98.3$^a$ | 100.7$^a$ | 97.7$^a$ | 90.4$^b$ | 91.0$^b$ | 1.11 | <0.001 |
| Val | 71.5$^e$ | 96.2$^{ab}$ | 97.0$^a$ | 92.7$^b$ | 78.5$^d$ | 89.2$^c$ | 1.23 | <0.001 |
| Mean | 74.9$^e$ | 96.3$^{ab}$ | 98.5$^a$ | 95.3$^{bc}$ | 79.4$^d$ | 93.0$^c$ | 1.06 | <0.001 |
| | | | | Dispensable amino acids | | | | |
| Ala | 76.2$^d$ | 96.6$^{ab}$ | 97.6$^a$ | 92.9$^{bc}$ | 76.9$^d$ | 91.0$^c$ | 1.58 | <0.001 |
| Asp | 58.7$^d$ | 90.7$^b$ | 99.7$^a$ | 94.2$^b$ | 73.6$^c$ | 93.9$^b$ | 1.54 | <0.001 |
| Cys | 84.6$^c$ | 94.2$^{ab}$ | 99.3$^a$ | 91.2$^b$ | 68.4$^d$ | 72.5$^d$ | 1.84 | <0.001 |
| Glu | 83.0$^b$ | 95.8$^a$ | 97.6$^a$ | 97.1$^a$ | 74.6$^c$ | 96.3$^a$ | 0.95 | <0.001 |
| Gly | 86.0$^{cd}$ | 104.4$^b$ | 136.3$^a$ | 102.4$^b$ | 78.5$^d$ | 93.7$^{bc}$ | 4.46 | <0.001 |
| Pro | 97.6$^{ab}$ | 116.0$^a$ | 140.3$^a$ | 129.2$^a$ | 54.7$^b$ | 113.3$^a$ | 22.06 | 0.012 |
| Ser | 76.2$^d$ | 96.4$^a$ | 95.2$^a$ | 95.3$^a$ | 82.5$^c$ | 91.1$^b$ | 1.30 | <0.001 |
| Tyr | 66.0$^e$ | 96.2$^b$ | 100.5$^a$ | 95.9$^b$ | 73.7$^d$ | 91.4$^c$ | 1.32 | <0.001 |
| Mean | 81.1$^c$ | 98.6$^{ab}$ | 105.1$^a$ | 99.6$^{ab}$ | 73.4$^d$ | 96.4$^b$ | 3.07 | <0.001 |
| Total AA | 78.4$^c$ | 97.6$^{ab}$ | 101.8$^a$ | 97.6$^{ab}$ | 76.2$^c$ | 94.2$^b$ | 1.97 | <0.001 |

$^{a-e}$Means within a row lacking a common superscript letter differ (P < 0.05).
[1]Least squares means for n = 8 except for RPI, RPI heat-treated, and WPI (n = 6).
[2]SID were calculated by correcting values for AID for the basal ileal endogenous losses. Endogenous losses (g/kg of dry matter intake) amino acids were as follows: crude protein, 20.84 Arg, 0.82; His, 0.21; Ile, 0.34; Leu, 0.58; Lys, 0.46; Met, 0.08; Phe, 0.36; Thr, 0.61; Trp, 0.11; Val, 0.58; Ala, 0.70; Asp, 0.83; Cys, 0.20; Glu, 1.03; Gly, 2.06; Pro, 8.90; Ser, 0.55; Tyr, 0.28.

Digestible Indispensable Amino Acid Score (DIAAS)

For infants from birth to 6 mo. (Table 7), WPI and SPI had the greatest (P<0.05) values for DIAAS followed by RPI heat-treated. BPC had the least (P<0.05) DIAAS value, and RPI had a greater (P<0.05) DIAAS value than BPC, and the DIAAS value for PPC was greater (P<0.05) than RPI and BPC. The first limiting amino acid for these proteins were as follows: aromatic amino acids (RPI, RPI heat-treated, and WPI), sulfur amino acids (SPI and PPC), and Lys (BPC).

For children from 6 mo. to 3 yr., RPI heat-treated had the greatest (P<0.05) DIAAS value, whereas, BPC had the least (P<0.05) DIAAS value. WPI had a DIAAS value less (P<0.05) than RPI heat-treated but greater (P<0.05) than SPI. The DIAAS value for RPI was less (P<0.05) than SPI and greater (P<0.05) than PPC, which had a DIAAS value greater (P<0.05) than BPC. The first limiting amino acid for the proteins compared with this reference protein pattern are as follows: Leu (RR), Lys (RPI heat-treated and BPC), His (WPI), and sulfur amino acids (SPI and PPC).

For older children, adolescents, and adults, WPI had the greatest (P<0.05) DIAAS value followed by RPI. The other experimental proteins followed the same order for DIAAS values calculated for children from 6 mo. to 3 yr. The first limiting amino acid for the proteins compared to this reference protein pattern are as follows: Leu (RPI and RPI heat-treated), Lys (BPC), His (WPI), and sulfur amino acids (SPI and PPC), almost the same as for children from 6 mo. to 3 yr.

TABLE 7A

Digestible indispensable amino acid score (DIAAS) in infants (birth to 6 mo.)[1]

| Item | RPI | RPI heat-treated | WPI | SPI | BPC | PPC | Pooled SEM | P-value |
|------|-----|------------------|-----|-----|-----|-----|------------|---------|
| | | | DIAA reference ratio | | | | | |
| His | 1.20 | 1.45 | 0.89 | 1.19 | 0.83 | 1.11 | | |
| Ile | 0.49 | 0.66 | 1.39 | 0.85 | 0.63 | 0.85 | | |
| Leu | 0.52 | 0.70 | 1.11 | 0.75 | 0.66 | 0.79 | | |
| Lys | 0.71 | 0.83 | 1.44 | 0.87 | 0.29 | 1.05 | | |
| SAA[2] | 1.37 | 1.53 | 1.47 | 0.68 | 1.00 | 0.49 | | |
| AAA[3] | 0.43 | 0.60 | 0.67 | 0.92 | 0.86 | 0.94 | | |
| Thr | 0.54 | 0.71 | 1.66 | 0.73 | 0.57 | 0.70 | | |
| Trp | 0.64 | 0.88 | 1.39 | 0.79 | 0.66 | 0.49 | | |
| Val | 0.65 | 0.87 | 1.18 | 0.86 | 0.89 | 0.88 | | |
| DIAAS, % Infant[4] | 43$^d$ (AAA) | 60$^b$ (AAA) | 67$^a$ (AAA) | 68$^a$ (SAA) | 29$^e$ (Lys) | 49$^c$ (SAA) | 0.88 | <0.001 |

Notes are explained below Table 7C.

TABLE 7B

Digestible indispensable amino acid score (DIAAS) in children (6 mo. to 3 yr.)[1]

| Item | RPI | RPI heat-treated | WPI | SPI | BPC | PPC | Pooled SEM | P-value |
|------|-----|------------------|-----|-----|-----|-----|------------|---------|
| | | | DIAA reference ratio | | | | | |
| His | 1.26 | 1.52 | 0.94 | 1.25 | 0.87 | 1.16 | | |
| Ile | 0.85 | 1.13 | 2.39 | 1.45 | 1.09 | 1.46 | | |
| Leu | 0.76 | 1.02 | 1.61 | 1.09 | 0.95 | 1.15 | | |
| Lys | 0.86 | 1.00 | 1.74 | 1.06 | 0.35 | 1.27 | | |
| SAA[2] | 1.67 | 1.87 | 1.79 | 0.83 | 1.22 | 0.60 | | |
| AAA[3] | 0.78 | 1.08 | 1.22 | 1.66 | 1.56 | 1.70 | | |
| Thr | 0.77 | 1.01 | 2.35 | 1.04 | 0.82 | 0.99 | | |
| Trp | 1.28 | 1.76 | 2.78 | 1.57 | 1.33 | 0.98 | | |
| Val | 0.83 | 1.11 | 1.51 | 1.10 | 1.14 | 1.13 | | |
| DIAAS, % Child[5] | 76$^d$ (Leu) | 100$^a$ (Lys) | 94$^b$ (His) | 83$^c$ (SAA) | 35$^f$ (Lys) | 60$^e$ (SAA) | 1.19 | <0.001 |

Notes are explained below Table 7C.

TABLE 7C

Digestible indispensable amino acid score (DIAAS) in older children, adolescents and adults (≥3 yr.)[1]

| Item | RPI | RPI heat-treated | WPI | SPI | BPC | PPC SEM | Pooled | P-value |
|------|-----|------------------|-----|-----|-----|---------|--------|---------|
| | | | DIAA reference ratio | | | | | |
| His | 1.57 | 1.90 | 1.17 | 1.56 | 1.09 | 1.45 | | |
| Ile | 0.91 | 1.21 | 2.55 | 1.55 | 1.16 | 1.55 | | |
| Leu | 0.83 | 1.10 | 1.74 | 1.18 | 1.03 | 1.24 | | |
| Lys | 1.02 | 1.19 | 2.07 | 1.26 | 0.42 | 1.51 | | |
| SAA[2] | 1.96 | 2.20 | 2.11 | 0.97 | 1.43 | 0.70 | | |
| AAA[3] | 0.99 | 1.38 | 1.55 | 2.10 | 1.98 | 2.15 | | |
| Thr | 0.95 | 1.25 | 2.92 | 1.29 | 1.01 | 1.23 | | |
| Trp | 1.65 | 2.27 | 3.58 | 2.03 | 1.71 | 1.27 | | |

TABLE 7C-continued

Digestible indispensable amino acid score (DIAAS) in older children, adolescents and adults (≥3 yr.)[1]

| Item | RPI | RPI heat-treated | WPI | SPI | BPC | PPC | SEM Pooled | P-value |
|---|---|---|---|---|---|---|---|---|
| Val DIAAS, % Older child, adolescent, adult[6] | 0.90 83[d] (Leu) | 1.19 110[b] (Leu) | 1.62 117[a] (His) | 1.19 97[c] (SAA) | 1.23 42[f] (Lys) | 1.21 70[e] (SAA) | 1.38 | <0.001 |

[a-f]Means within a row lacking a common superscript letter differ (P < 0.05).
[1]First-limiting amino acid is in parentheses.
[2]SAA = Sulfur Amino Acids.
[3]AAA = Aromatic Amino Acids.
[4]DIAAS calculated using the recommended scoring pattern for an infant (birth to 6 mo.). The indispensable AA reference patterns are expressed as mg AA/g protein: His, 21; Ile, 55; Leu, 96; Lys, 69; SAA, 33; AAA, 94; Thr, 44; Trp, 17; Val, 55 (Report of an FAO Expert Consultation (2013) FAO of the United Nations, Dietary Protein Quality Evaluation in Human Nutrition).
[5]DIAAS calulated using the recommended scoring pattern for a child (6 mo. to 3 yr.). The indispensable AA reference patterns are expressed as mg AA/g protein: His, 20; Ile, 32; Leu, 66; Lys, 57; SAA, 27; AAA, 52; Thr, 31; Trp, 8.5; Val, 40 (reference as under [4]).
[6]DIAAS calulated using the recommended scoring pattern for an older child/adolescent/adult (≥3 yr.). The indispensable AA reference pattersn are expressed as mg AA/g protein: His, 16; Ile, 30; Leu, 61; Lys, 48; SAA, 23; AAA, 41; Thr, 25; Trp, 6.6; Val, 40 (reference as under [4]).

The invention claimed is:

1. A rapeseed protein isolate having a Digestible Indispensable Amino Acid Score or DIAAS value in older children, adolescents and adults aged 3 years and older which is equal to or higher than 100, having a ΔH value as determined by Differential Scanning calorimetry of a 40% solution or dispersion of said rapeseed protein isolate in water of 0±0.5 J/g, and having a solubility in water of from 20% to 50% when measured at pH 6.8±0.1 and 20±1° C.

2. The rapeseed protein isolate according to claim 1, having a DIAAS value from 101 to 130.

3. The rapeseed protein isolate according to claim 1, wherein said DIAAS value in older children, adolescents and adults aged 3 years and older is from 100 to 200.

4. The rapeseed protein isolate according to claim 1 wherein said DIAAS value in older children, adolescents and adults aged 3 years and older is 110±10.

5. The rapeseed protein isolate according to claim 1, having a DIAAS value in children aged 6 months to 3 years of from 100 to 125.

6. The rapeseed protein isolate according to claim 5, wherein said DIAAS value in children aged 6 months to 3 years is from 101 to 120.

7. The rapeseed protein isolate according to claim 1 wherein said DIAAS value is calculated using equation DIAAS (%)=100×lowest value of the digestible indispensable amino acid reference ratio.

8. The rapeseed protein isolate according to claim 1 wherein the rapeseed protein isolate comprises from 40 to 65% (w/w) cruciferins and from 35 to 60% (w/w) napins, the total being equal to or less than 100% (w/w) or comprises 80-100% (w/w) cruciferins and 0-20% (w/w) napins, or comprises 0-20% (w/w) cruciferins and 80-100% (w/w) napins, wherein the sum of cruciferins and napins does not exceed 100% (w/w).

9. The rapeseed protein isolate according to claim 1 having a solubility in water of 45±5%, when measured at pH 6.8±0.1 and 20±1° C.

10. A method for preparing the rapeseed protein isolate according to claim 1, comprising incubating a mixture comprising native rapeseed protein isolate and water at a temperature of from 85 to 95° C. for a period of from 8 to 20 minutes and homogenizing the mixture to form rapeseed protein isolate microparticles.

11. The method according to claim 10 further comprising drying the mixture following the homogenizing.

12. The method according to claim 11 wherein the homogenizing comprises high-pressure homogenizing or wet milling.

13. The method according to claim 12 wherein the high-pressure homogenizing is carried out at a pressure of between 50 bar and 600 bar.

14. The method according to claim 12 wherein the high-pressure homogenizing is carried out at a pressure of between 200 bar and 400 bar.

15. The method of claim 10, wherein the incubating occurs at a temperature of 90° C. for a period of 10 minutes.

16. A method for making a food product, comprising mixing the rapeseed protein isolate according to claim 1 with a food product.

17. A food product prepared with the rapeseed protein isolate according to claim 1.

18. A food product comprising the rapeseed protein isolate according to claim 1.

19. A method for making a food product, comprising: mixing a native rapeseed protein isolate with a food product; incubating the obtained mixture at a temperature of from 85 to 95° C. for a period of from 8 to 20 minutes; and subsequently homogenizing the mixture to form rapeseed protein isolate microparticles.

20. The method of claim 19, comprising wherein the temperature is 90° C. and the period is 10 minutes.

* * * * *